US012562790B2

(12) United States Patent
Liao et al.

(10) Patent No.: US 12,562,790 B2
(45) Date of Patent: Feb. 24, 2026

(54) CODEBOOK GENERATION METHOD AND ELECTRONIC APPARATUS

(71) Applicant: ASUSTeK COMPUTER INC., Taipei (TW)

(72) Inventors: Sung-Mao Liao, Taipei (TW); Kuo-Chu Liao, Taipei (TW); Chuan-Chien Huang, Taipei (TW); Chien-Ming Hsu, Taipei (TW); Shih-Yuan Chen, Taipei (TW); Ping-Chia Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 1 day.

(21) Appl. No.: 18/827,459

(22) Filed: Sep. 6, 2024

(65) Prior Publication Data

US 2025/0132795 A1    Apr. 24, 2025

(30) Foreign Application Priority Data

Oct. 24, 2023    (TW) ................................. 112140681

(51) Int. Cl.
H04B 7/0456 (2017.01)

(52) U.S. Cl.
CPC ......... H04B 7/0478 (2013.01); H04B 7/0465 (2013.01); H04B 7/0487 (2023.05)

(58) Field of Classification Search
CPC .......... H04B 7/02; H04B 7/04; H04B 7/0413; H04B 7/0456; H04B 7/0478; H04B 7/0479; H04B 7/0481; H04B 7/0482; H04B 7/0487; H04B 7/046; H04B 7/0465
See application file for complete search history.

(56) References Cited

U.S. PATENT DOCUMENTS

| | | | | |
|---|---|---|---|---|
| 9,872,296 B2 * | 1/2018 | Raghavan | ........... | H04W 72/542 |
| 10,056,956 B2 * | 8/2018 | Rahman | ................ | H04B 7/0626 |
| 10,164,694 B2 * | 12/2018 | Girnyk | .................. | H04B 7/0639 |
| 10,356,789 B2 * | 7/2019 | Raghavan | ........... | H04B 7/0617 |
| 10,541,735 B2 * | 1/2020 | Girnyk | .................. | H04B 7/063 |
| 10,742,282 B2 * | 8/2020 | Ganji | ................... | H04B 7/0617 |

(Continued)

FOREIGN PATENT DOCUMENTS

| | | |
|---|---|---|
| CN | 103929280 A | 6/2017 |
| CN | 113382418 B | 3/2023 |

*Primary Examiner* — James M Perez
(74) *Attorney, Agent, or Firm* — McClure, Qualey & Rodack, LLP

(57) ABSTRACT

A codebook generation method and an electronic apparatus are provided. The codebook generation method includes: collecting a plurality of pieces of electric field information of a plurality of antenna units in at least one millimeter-wave antenna module based on an initial codebook; correspondingly generating a full chain codebook (Full Chain Codebook) based on the electric field information; then, extendedly generating a sub chain codebook (Sub Chain Codebook) based on the full chain codebook; and finally generating, based on the full chain codebook and the sub chain codebook, an optimized codebook (Optimized Codebook) by using a power saving algorithm or a cumulative distribution function 50% gain loss algorithm. Therefore, the electronic apparatus using the optimized codebook is more excellent in power saving efficiency and overall efficiency performance.

14 Claims, 10 Drawing Sheets

(56) References Cited

U.S. PATENT DOCUMENTS

| 11,108,444 | B2* | 8/2021 | Varatharaajan | H04B 7/0478 |
|---|---|---|---|---|
| 11,394,437 | B2* | 7/2022 | Raghavan | H04B 7/0456 |
| 11,843,434 | B2* | 12/2023 | Bshara | H04B 7/0491 |
| 12,237,893 | B2* | 2/2025 | Raghavan | H04L 5/0094 |
| 2011/0268207 | A1* | 11/2011 | Choi | H04B 7/0478 |
| | | | | 375/267 |
| 2014/0153661 | A1* | 6/2014 | Hochwald | H04B 7/0465 |
| | | | | 375/267 |
| 2016/0198474 | A1* | 7/2016 | Raghavan | H04B 7/0456 |
| | | | | 370/335 |
| 2017/0279509 | A1* | 9/2017 | Rahman | H04W 72/04 |
| 2017/0347358 | A1* | 11/2017 | Raghavan | H04B 7/0874 |
| 2018/0048364 | A1* | 2/2018 | Girnyk | H04B 7/0456 |
| 2019/0013844 | A1* | 1/2019 | Girnyk | H04B 7/0639 |
| 2019/0222275 | A1* | 7/2019 | Mo | H04W 72/51 |
| 2020/0119785 | A1* | 4/2020 | Varatharaajan | H04B 7/0478 |
| 2020/0195320 | A1* | 6/2020 | Raghavan | H04L 5/0057 |
| 2020/0358498 | A1* | 11/2020 | Mo | H04B 7/0695 |
| 2021/0306042 | A1* | 9/2021 | Bshara | H04B 7/0695 |
| 2022/0038146 | A1* | 2/2022 | Mo | H04W 24/10 |
| 2022/0159684 | A1* | 5/2022 | Mo | H04L 5/0007 |
| 2023/0006721 | A1* | 1/2023 | Raghavan | H04L 5/0048 |
| 2023/0198596 | A1* | 6/2023 | Geren | H04B 7/088 |
| | | | | 375/262 |
| 2024/0275433 | A1* | 8/2024 | Li | H04B 17/391 |
| 2025/0055520 | A1* | 2/2025 | Göransson | H04B 7/0452 |
| 2025/0132795 | A1* | 4/2025 | Liao | H04B 7/0465 |
| 2025/0167843 | A1* | 5/2025 | Raghavan | H04B 7/088 |
| 2025/0202540 | A1* | 6/2025 | Guo | H04B 7/15528 |

* cited by examiner

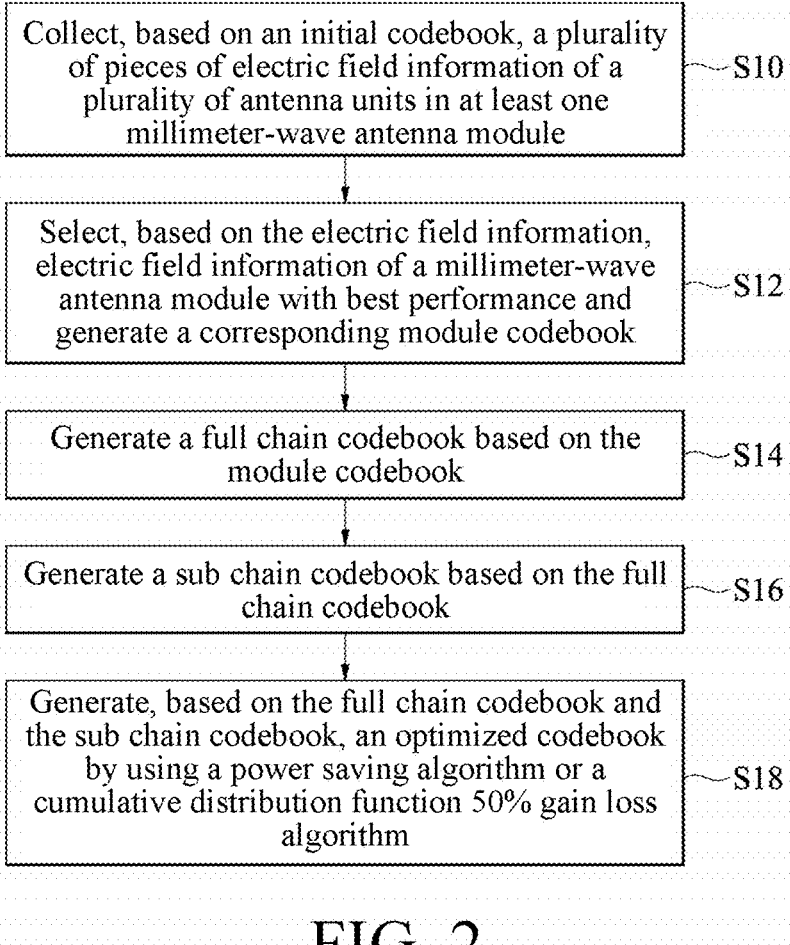

Collect, based on an initial codebook, a plurality of pieces of electric field information of a plurality of antenna units in at least one millimeter-wave antenna module — S10

Select, based on the electric field information, electric field information of a millimeter-wave antenna module with best performance and generate a corresponding module codebook — S12

Generate a full chain codebook based on the module codebook — S14

Generate a sub chain codebook based on the full chain codebook — S16

Generate, based on the full chain codebook and the sub chain codebook, an optimized codebook by using a power saving algorithm or a cumulative distribution function 50% gain loss algorithm — S18

FIG. 2

CODEBOOK GENERATION METHOD AND ELECTRONIC APPARATUS

CROSS-REFERENCE TO RELATED APPLICATIONS

This application claims the priority benefit of Taiwan Application Serial No. 112140681, filed on Oct. 24, 2023. The entirety of the above-mentioned patent application is hereby incorporated by reference herein and made a part of specification.

BACKGROUND OF THE INVENTION

Field of the Invention

The disclosure relates to a codebook (codebook) generation method that can improve performance of a millimeter-wave module.

Description of the Related Art

Designing of a beam codebook is an important technology in a 5G communication environment and plays an important role in implementing efficient and reliable communication between a base station (BS) and user equipment (such as a mobile phone).

In an existing millimeter-wave mobile phone, electric field information activated by a feed point of a millimeter-wave frequency band antenna on a millimeter-wave module is collected through actual measurement or simulation, and then an operation is performed based on a codebook algorithm template provided by a module supplier, to generated a codebook. However, the used algorithm is a black box and content of the algorithm cannot be known. Consequently, the codebook of the existing millimeter-wave module is in a standard format and does not have a customized design, and performance and a power saving effect cannot be optimized.

BRIEF SUMMARY OF THE INVENTION

The disclosure provides a codebook generation method. The method includes: collecting a plurality of pieces of electric field information of a plurality of antenna units in at least one millimeter-wave antenna module based on an initial codebook; correspondingly generating a full chain codebook (Full Chain Codebook) based on the electric field information; then, extendedly generating a sub chain codebook (Sub Chain Codebook) based on the full chain codebook; and finally, generating, based on the full chain codebook and the sub chain codebook, an optimized codebook (Optimized Codebook) by using a power saving algorithm or a cumulative distribution function 50% gain loss algorithm.

The disclosure further provides an electronic apparatus, including at least one millimeter-wave antenna module, a processing apparatus, and a storage apparatus. The millimeter-wave antenna module includes a plurality of antenna units. The millimeter-wave antenna module enables, based on an initial codebook, all feed points of the antenna units to generate a plurality of pieces of electric field information respectively. The processing apparatus is electrically connected to the millimeter-wave antenna module, to receive the electric field information. The processing apparatus correspondingly generates a full chain codebook based on the electric field information. The processing apparatus extendedly generates a sub chain codebook based on the full chain codebook. The processing apparatus then generates, based on the full chain codebook and the sub chain codebook, an optimized codebook by using a power saving algorithm or a cumulative distribution function 50% gain loss algorithm. The storage apparatus is electrically connected to the processing apparatus, to store the initial codebook, the full chain codebook, the sub chain codebook, and the optimized codebook.

In conclusion, the disclosure provides the codebook generation method and the electronic apparatus generating the codebook, to improve performance of a millimeter-wave antenna module in an electronic apparatus (such as a mobile phone). The optimized codebook is obtained by using an innovative algorithm, to maximize performance while taking into account power saving (Power saving). A millimeter-wave transmission throughput of the electronic apparatus is increased to optimize user experience.

BRIEF DESCRIPTION OF THE DRAWINGS

FIG. 2 is a schematic flowchart of a codebook generation method according to an embodiment of the disclosure;

DETAILED DESCRIPTION OF THE EMBODIMENTS

Figure 1:
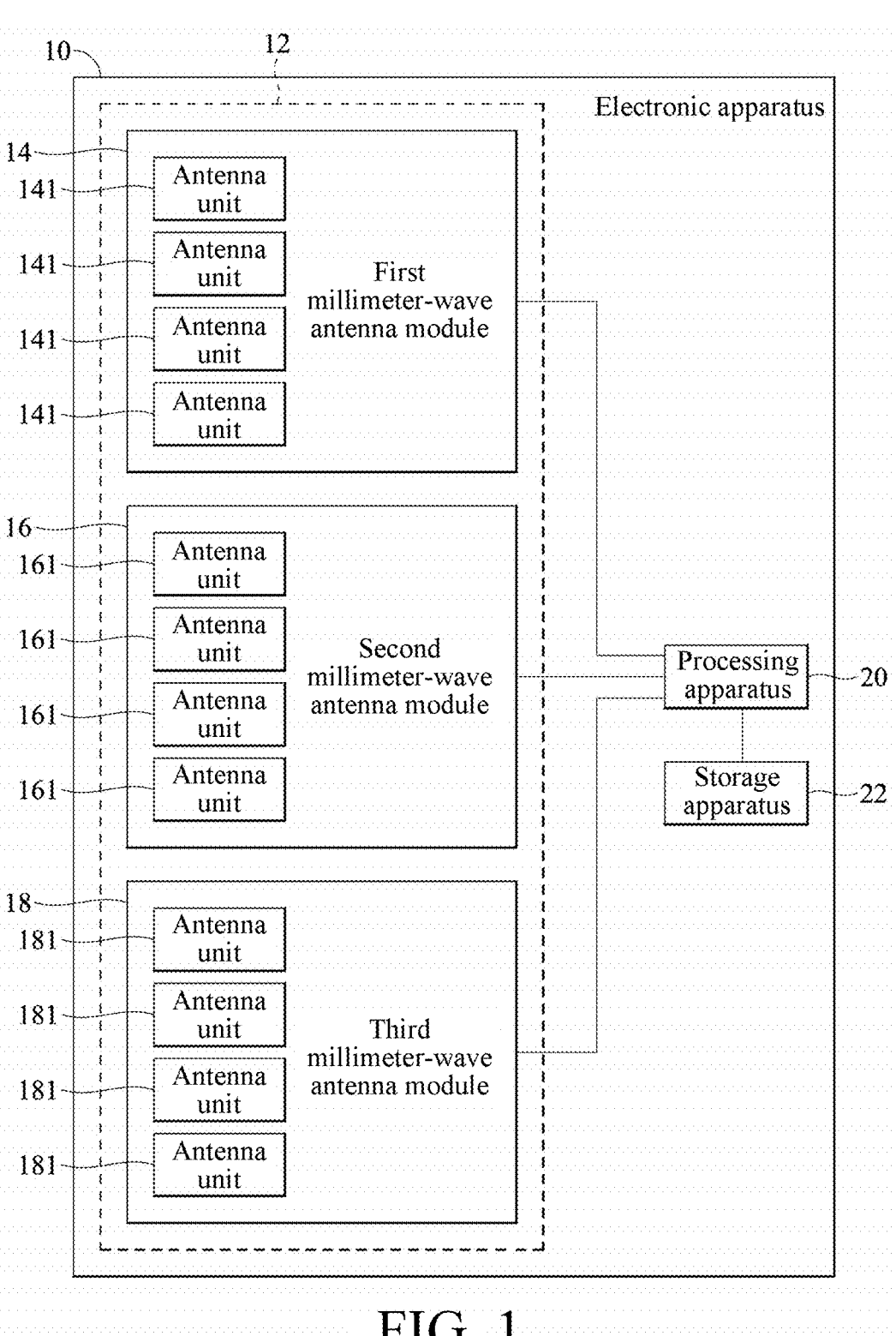
FIG. 1 is a schematic block diagram of a circuit of an electronic apparatus according to an embodiment of the disclosure.
Figure 3A:
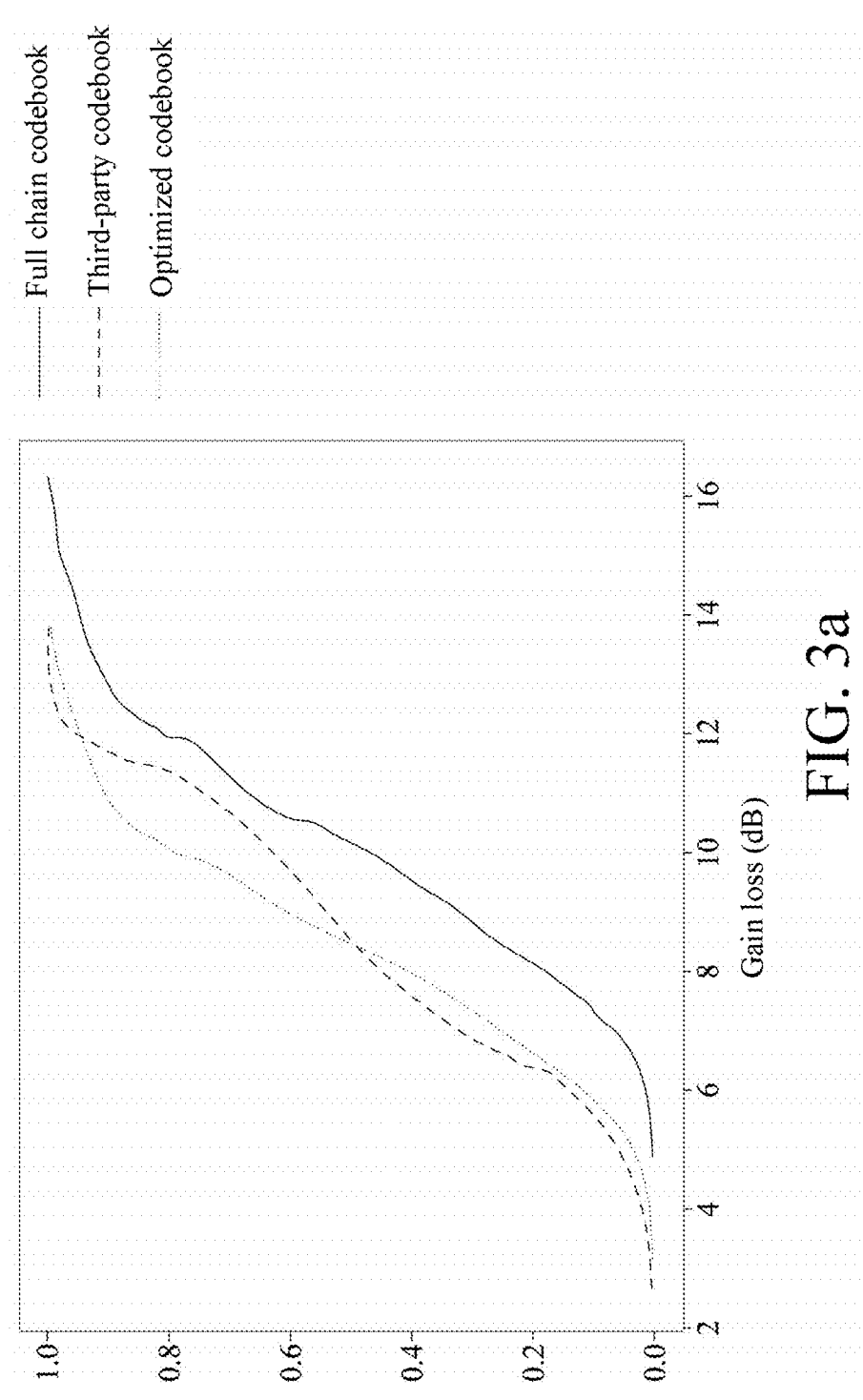
FIG. 3a is a curve graph of performance comparison between a full chain codebook, an optimized codebook, and a third-party codebook under a specific gain loss and in a low-frequency vertical polarization mode according to an embodiment of the disclosure.
Figure 3B:
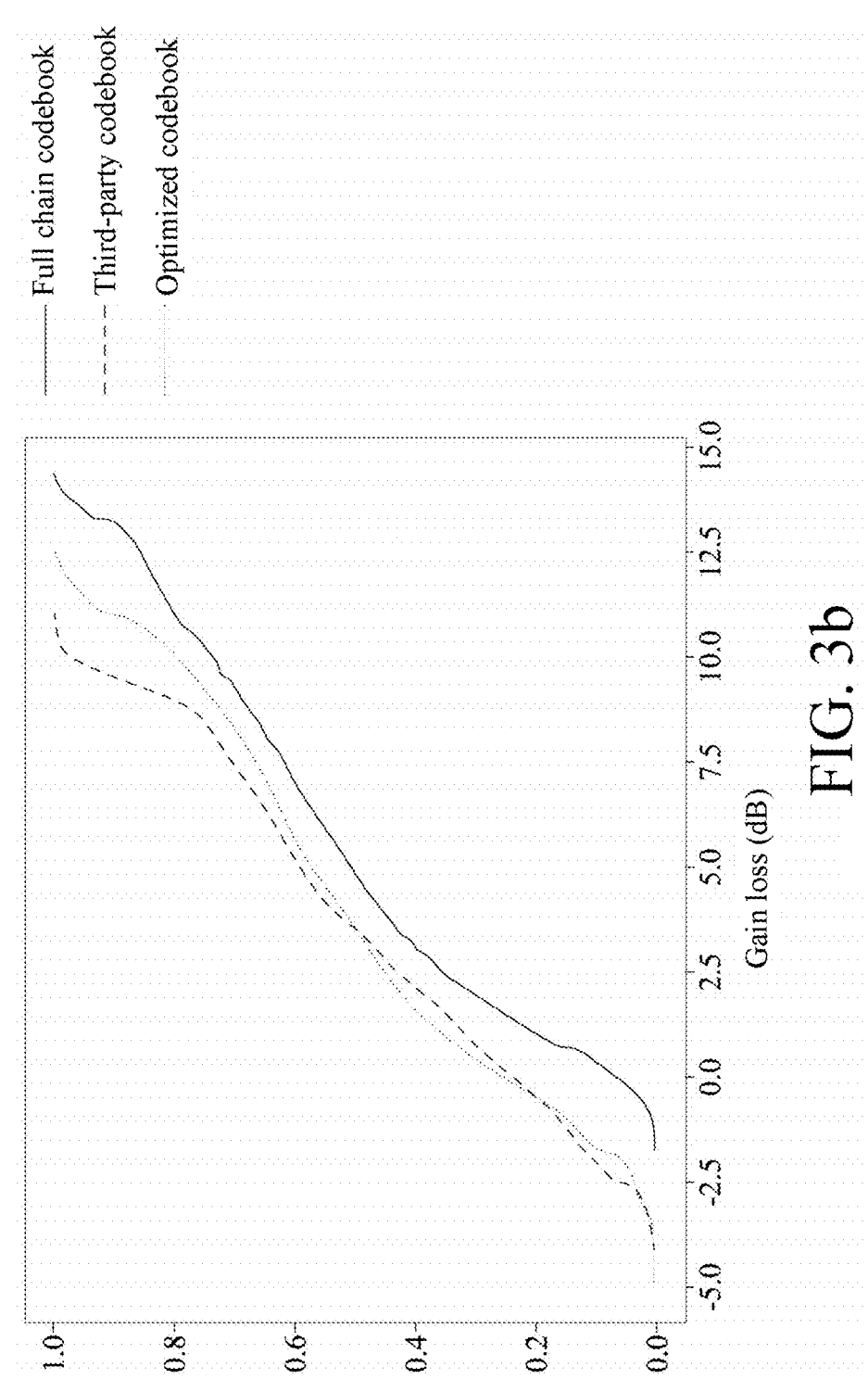
FIG. 3b is a curve graph of performance comparison between a full chain codebook, an optimized codebook, and a third-party codebook under a specific gain loss and in a low-frequency horizontal polarization mode according to an embodiment of the disclosure.
Figure 3C:
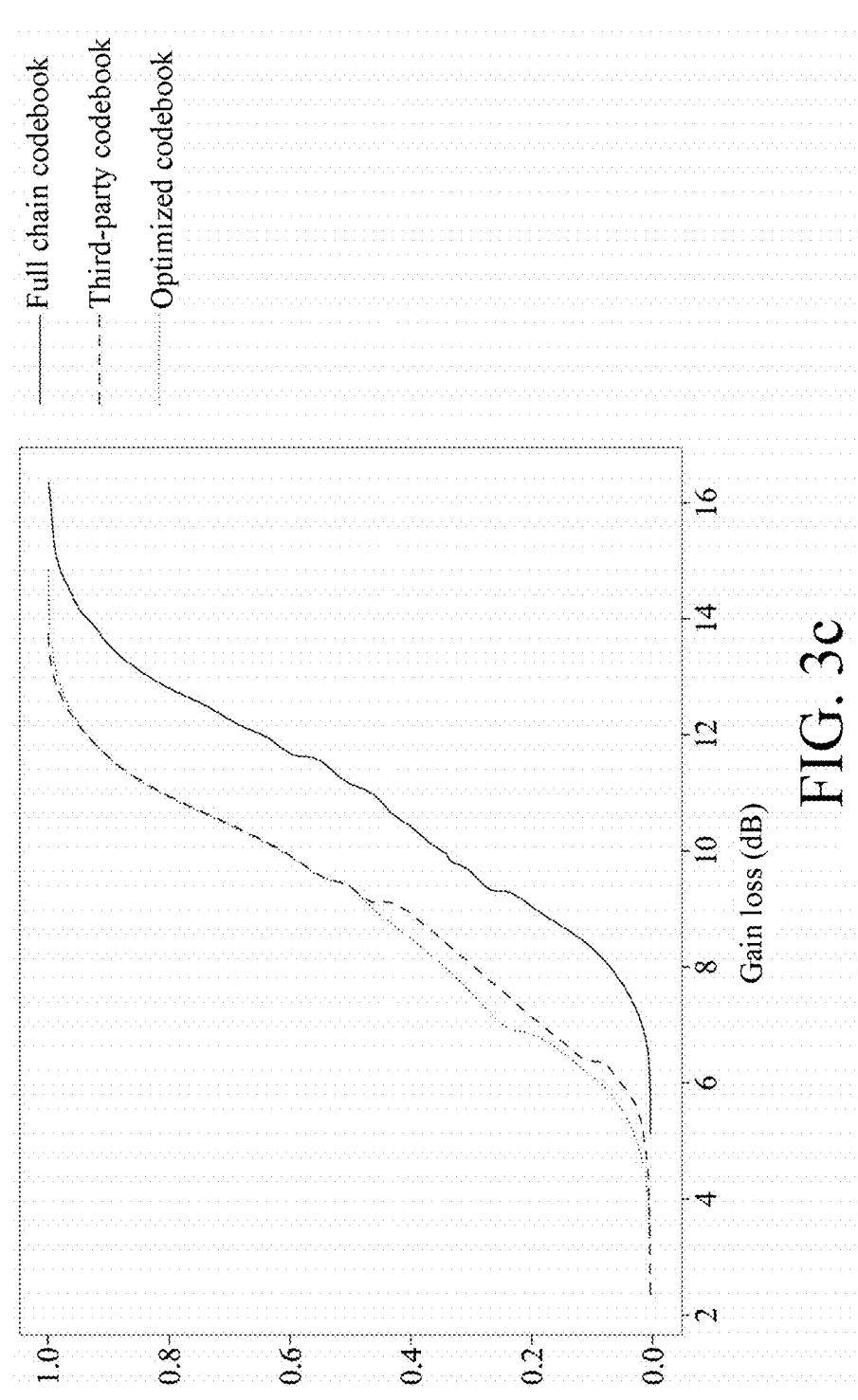
FIG. 3c is a curve graph of performance comparison between a full chain codebook, an optimized codebook, and a third-party codebook under a specific gain loss and in a high-frequency vertical polarization mode according to an embodiment of the disclosure.
Figure 3D:
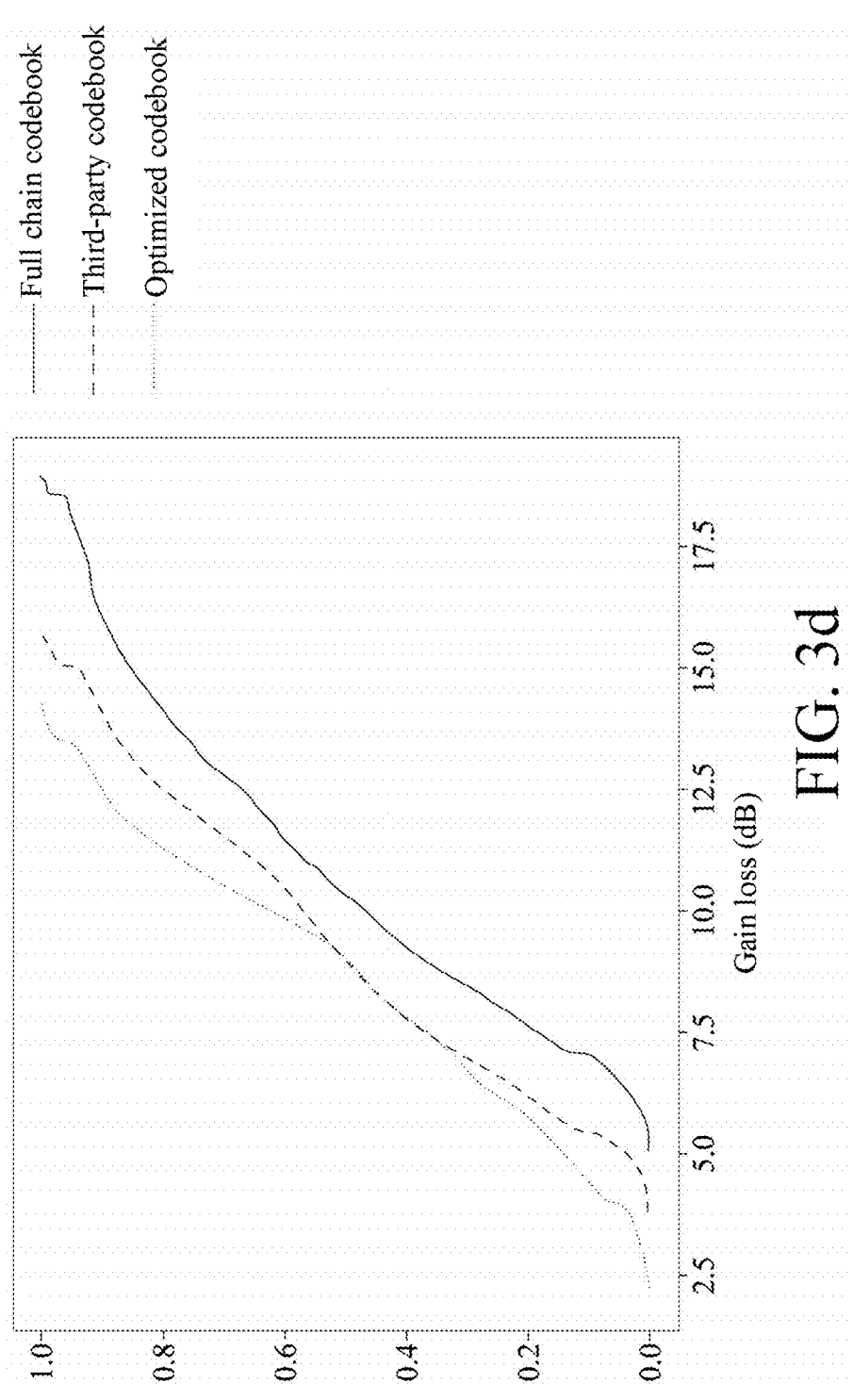
FIG. 3d is a curve graph of performance comparison between a full chain codebook, an optimized codebook, and a third-party codebook under a specific gain loss and in a high-frequency horizontal polarization mode according to an embodiment of the disclosure.
Figure 4A:
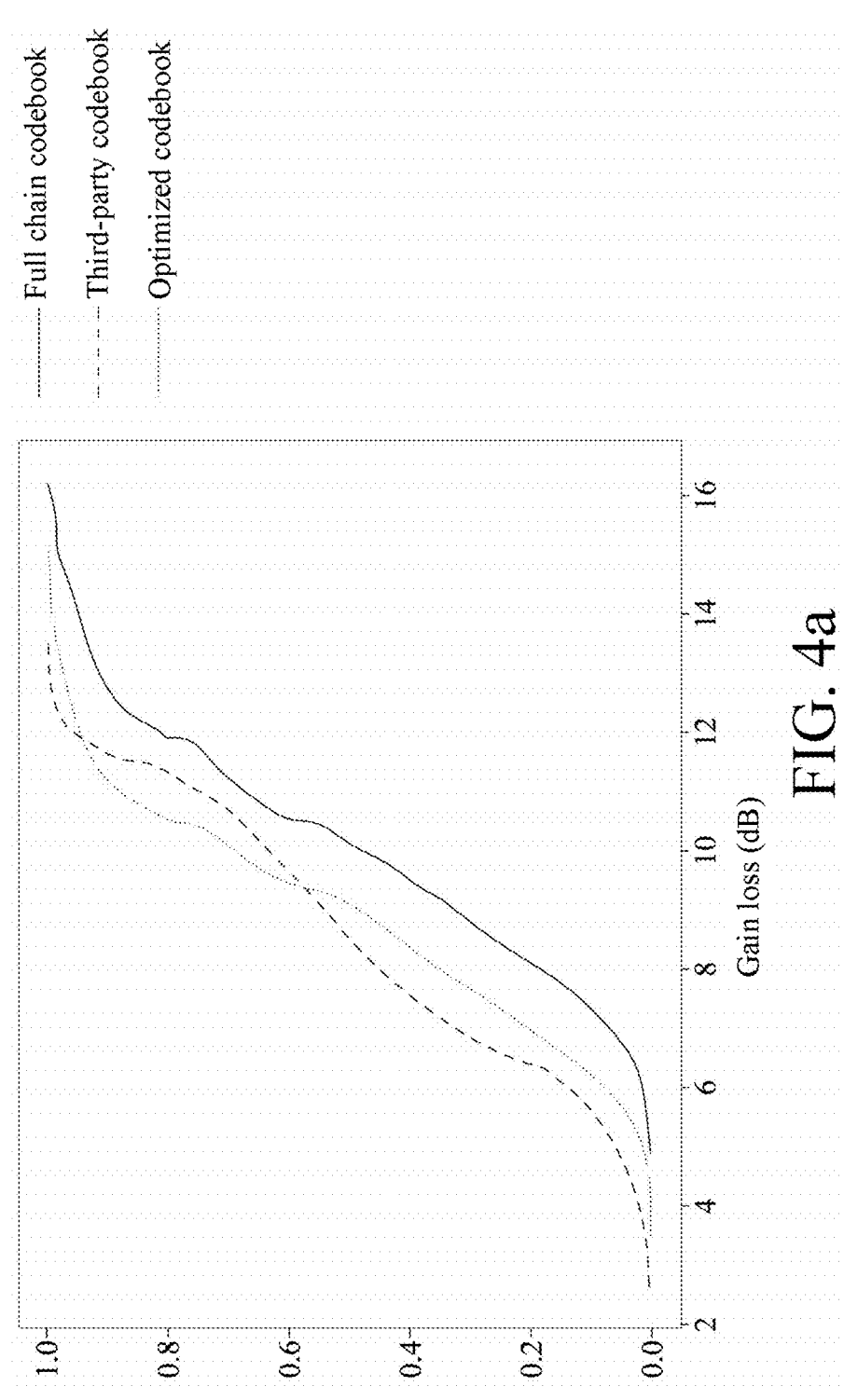
FIG. 4a is a curve graph of performance comparison between a full chain codebook, an optimized codebook, and a third-party codebook under a specific power saving efficiency and in a low-frequency vertical polarization mode according to an embodiment of the disclosure.
Figure 4B:
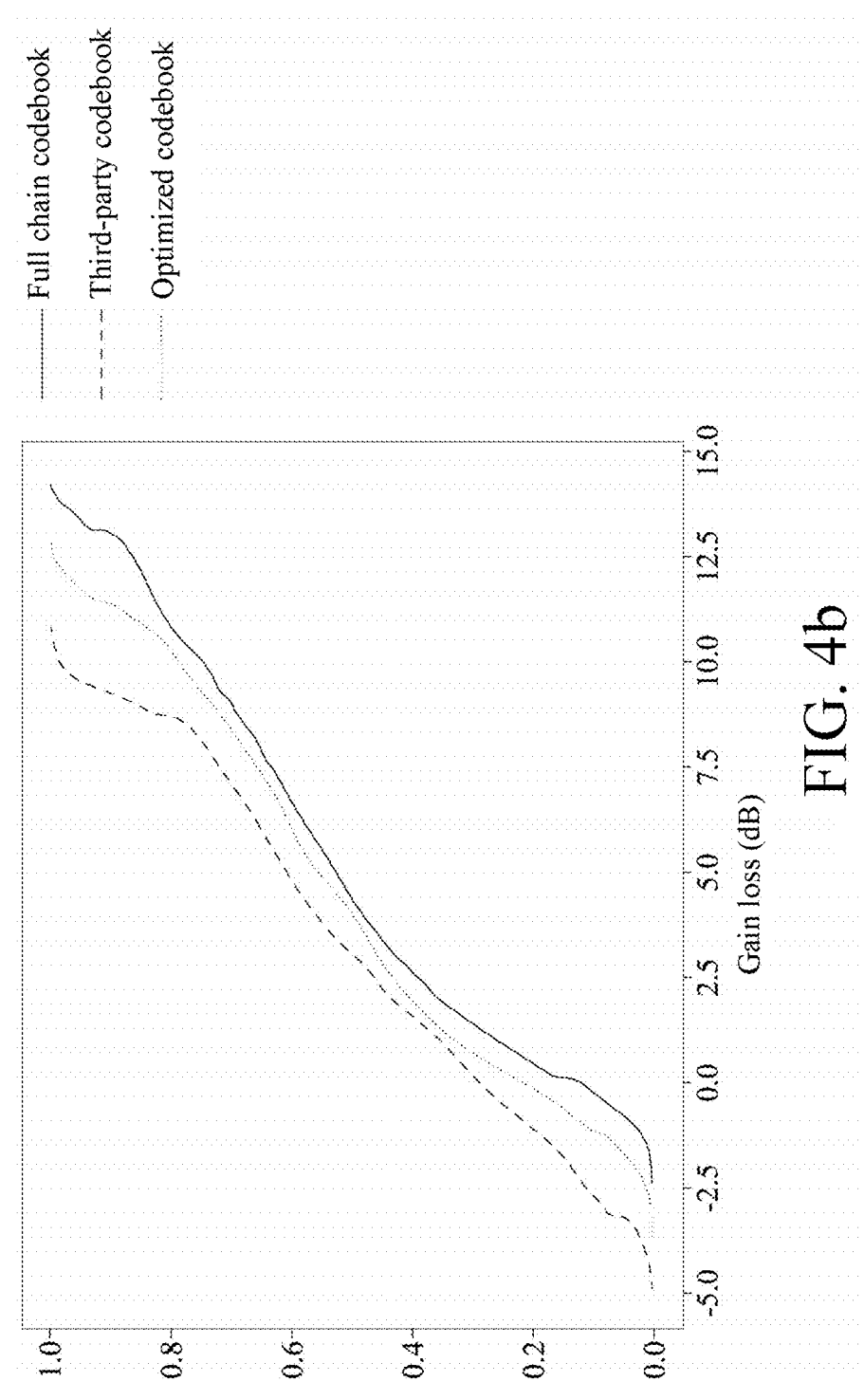
FIG. 4b is a curve graph of performance comparison between a full chain codebook, an optimized codebook, and a third-party codebook under a specific power saving efficiency and in a low-frequency horizontal polarization mode according to an embodiment of the disclosure.
Figure 4C:
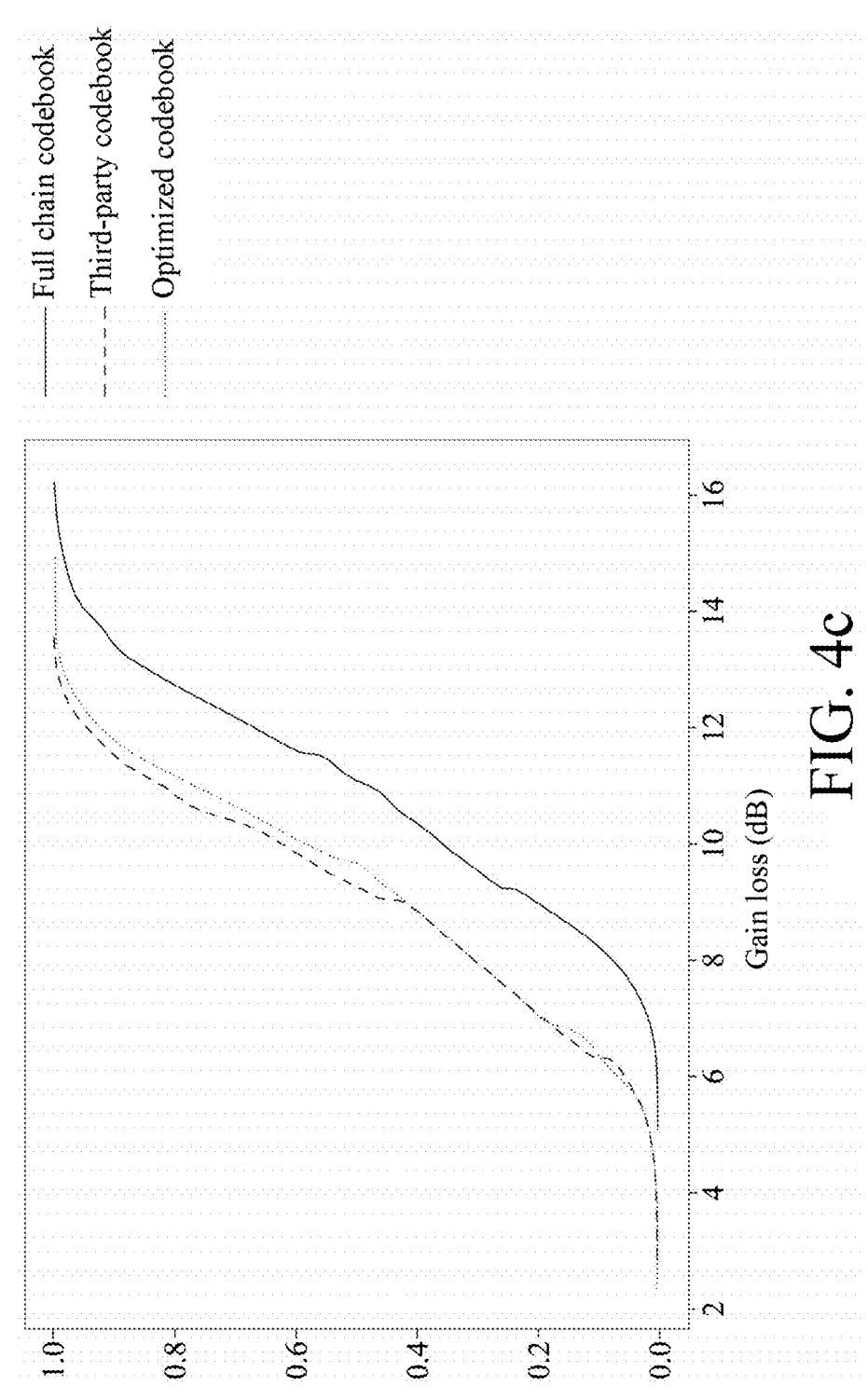
FIG. 4c is a curve graph of performance comparison between a full chain codebook, an optimized codebook, and a third-party codebook under a specific power saving efficiency and in a high-frequency vertical polarization mode according to an embodiment of the disclosure.
Figure 4D:
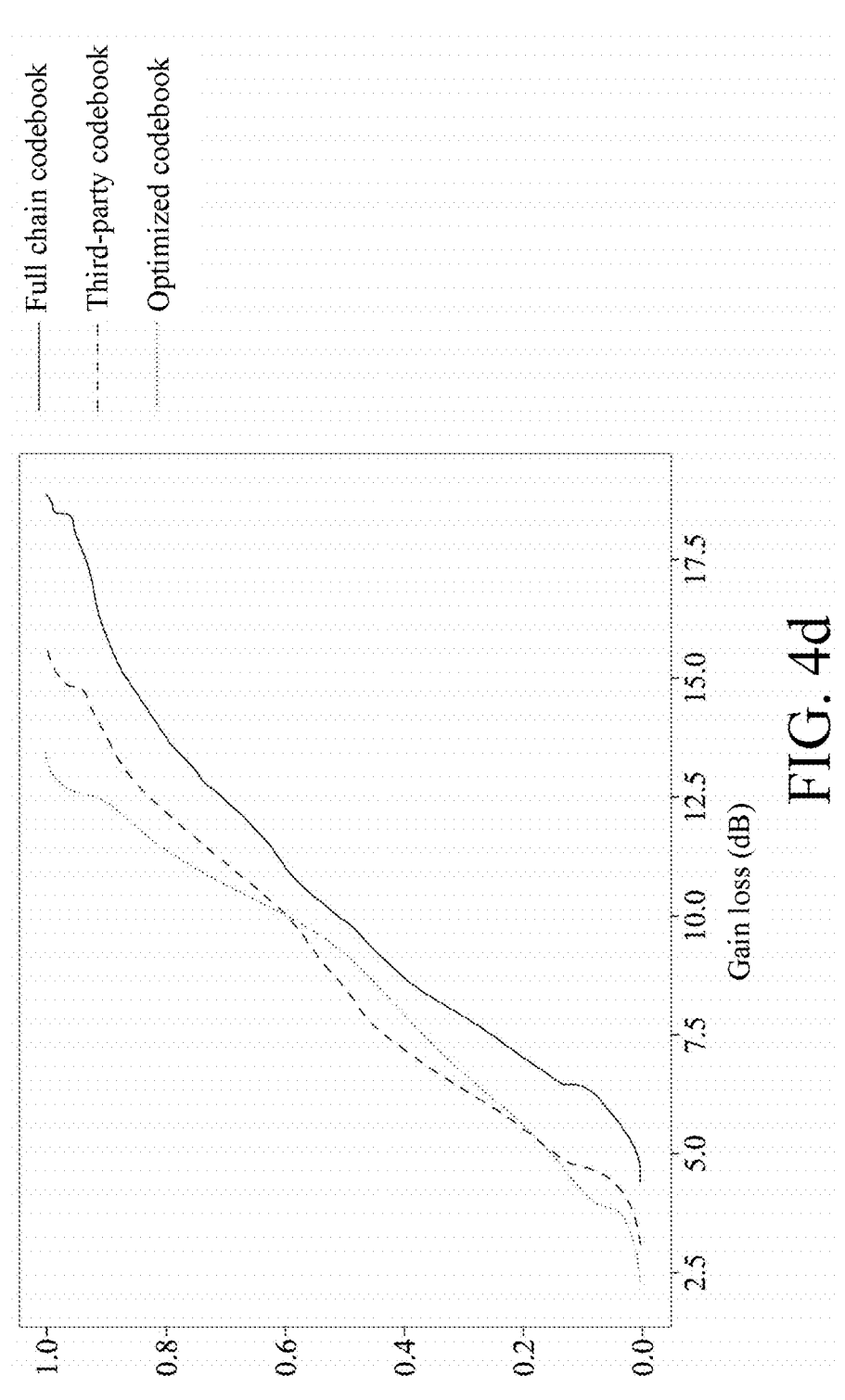
FIG. 4d is a curve graph of performance comparison between a full chain codebook, an optimized codebook, and a third-party codebook under a specific power saving efficiency and in a high-frequency horizontal polarization mode according to an embodiment of the disclosure.

The following describes embodiments of the disclosure with reference to the accompanying drawings. In addition, some assemblies or structures are omitted in the drawings in embodiments, to clearly show technical characteristics of the disclosure. In the drawings, the same reference numbers refer to the same or similar assemblies or circuits. It needs to be understood that, although the terms "first", "second", and the like can be used herein to describe various assemblies, components, areas, or functions, these assemblies, components, areas, and/or functions should not be limited by these terms, and these terms are merely used to distinguish one assembly, component, area, or function from another assembly, component, area, or function.

Refer to FIG. 1. An electronic apparatus 10 includes at least one millimeter-wave antenna module 12, a processing apparatus 20, and a storage apparatus 22. Because a standard 5G (including a millimeter-wave) mobile phone is usually configured with two to three groups of millimeter-wave antenna modules, and each module includes a plurality of groups of antenna units, in this embodiment, that the electronic apparatus 10 includes three groups of millimeter-wave antenna modules 12 is used as an example. The three groups of millimeter-wave antenna modules 12 include a first millimeter-wave antenna module 14, a second millimeter-wave antenna module 16, and a third millimeter-wave antenna module 18. The first millimeter-wave antenna module 14 includes four groups of antenna units 141, the second millimeter-wave antenna module 16 includes four groups of antenna units 161, and the third millimeter-wave antenna module 18 also includes four groups of antenna units 181. This is not limited in the disclosure. The processing apparatus 20 is electrically connected to the first millimeter-wave antenna module 14, the second millimeter-wave antenna module 16, and the third millimeter-wave antenna module 18, to use at least one of the first millimeter-wave antenna module 14, the second millimeter-wave antenna module 16, and the third millimeter-wave antenna module 18 as a millimeter-wave antenna module 12 for current communication. The processing apparatus 20 is also electrically connected to the storage apparatus 22, to use the storage apparatus 22 to store all data and information that are required by the processing apparatus 20 in a process of generating a codebook.

In the electronic apparatus 10, using the first millimeter-wave antenna module 14 as an example, the first millimeter-wave antenna module 14 enables, based on an initial codebook, all feed points of each antenna unit 141 to generate a plurality of pieces of electric field information after the feed points are activated respectively. Each antenna unit 141 has dual-frequency and dual-linear polarization characteristics to provide four operating modes, including a low-frequency vertical polarization mode, a low-frequency horizontal polarization mode, a high-frequency vertical polarization mode, and a high-frequency horizontal polarization mode. Based on this, in the disclosure, an independent codebook with a same size is established for each operating mode. The independent codebooks are respectively a low-frequency vertical polarization codebook, a low-frequency horizontal polarization codebook, a high-frequency vertical polarization codebook, and a high-frequency horizontal polarization codebook. Each row of code words (code word) in each codebook is defined as a beamforming vector, and each code word can activate only one antenna unit 141 at a time. Therefore, the initial codebook includes the foregoing low-frequency vertical polarization codebook, low-frequency horizontal polarization codebook, high-frequency vertical polarization codebook, and high-frequency horizontal polarization codebook. Similarly, the second millimeter-wave antenna module 16 enables, based on an initial codebook, all feed points of each antenna unit 161 to generate a plurality of pieces of electric field information after the feed points are activated respectively. The third millimeter-wave antenna module 18 enables, based on an initial codebook, all feed points of each antenna unit 181 to generate a plurality of pieces of electric field information after the feed points are activated respectively. Because the first millimeter-wave antenna module 14, the second millimeter-wave antenna module 16, and the third millimeter-wave antenna module 18 are disposed in different locations, the obtained corresponding electric field information is also different. Then, the processing apparatus 20 receives all the electric field information, and selects, based on the electric field information, electric field information of a millimeter-wave antenna module 12 with best performance and generates a corresponding module codebook (Module Codebook). The processing apparatus 20 then correspondingly generates, based on the module codebook, a full chain codebook by using a k-means clustering algorithm. When the full chain codebook is initially obtained, the full chain codebook includes a plurality of code words (beamforming vectors). The processing apparatus 20 further views the full chain codebook to remove a duplicate code word and populate a new code word that is additionally generated and that corresponds to a weak coverage area, and accordingly construct a complete full chain codebook without the duplicate code word. The processing apparatus 20 extendedly generates, based on the full chain codebook, a sub chain codebook by using a beam correspondence spherical coverage (beam correspondence spherical coverage, BC-SC) algorithm. Then the processing apparatus 20 generates, based on the full chain codebook and the sub chain codebook, an optimized codebook by using a power saving algorithm or a cumulative distribution function 50% gain loss algorithm. The foregoing initial codebook, full chain codebook, sub chain codebook, optimized codebook, and the like are stored in the storage apparatus 22 for accessing by the processing apparatus 20.

In an embodiment, the foregoing initial codebook, full chain codebook, sub chain codebook, and optimized codebook have a same codebook size (a number of code word lines of the codebook is the same). In other words, the initial codebook includes four codebooks with the same size: the low-frequency vertical polarization codebook, the low-frequency horizontal polarization codebook, the high-frequency vertical polarization codebook, and the high-frequency horizontal polarization codebook. Therefore, there are also four full chain codebooks, four sub chain codebooks and four finally generated optimized codebooks that respectively correspond to the low-frequency vertical polarization mode, the low-frequency horizontal polarization mode, the high-frequency vertical polarization mode, and the high-frequency horizontal polarization mode that are different. In another embodiment, the four full chain codebooks, the four sub chain codebooks, or the four optimized codebooks are respectively integrated into a single codebook, provided that the codebook assists the millimeter-wave antenna module 12 to select an appropriate antenna unit 141/161/181. In this way, when the electronic apparatus 10 needs to adapt to different environments or scenarios, the appropriate millimeter-wave antenna module 12 and antenna unit 141/161/181 thereof are selected.

In an embodiment, the electronic apparatus 10 may be a notebook computer, a tablet personal computer, a smart phone, or the like. This is not limited in the disclosure.

In an embodiment, the processing apparatus 20 may be but is not limited to a modem (Modem), a transceiver (Transceiver), a central processing unit (Central Processing Unit, CPU), an embedded controller (embedded controller, EC), a microprocessor (Microprocessor), a digital signal processor (digital signal processor, DSP), an application-specific integrated circuit (Application-specific Integrated Circuit, ASIC), a system on a chip (System on a chip, SoC), another similar assembly or combination, or the like. This is not limited in the disclosure.

In an embodiment, the storage apparatus 22 may be any form of fixed or removable random access memory (random access memory, RAM), a read-only memory (read-only memory, ROM), a flash memory (flash memory), a hard disk drive (hard disk drive, HDD), a solid-state drive (solid-state drive, SSD), or another similar assembly or a combination of the foregoing assemblies, to store any information or data or the like required by the processing apparatus 20. This is not limited in the disclosure.

Refer to both FIG. 1 and FIG. 2. A procedure of generating the optimized codebook by the electronic apparatus 10 includes the following steps. First, as shown in step S10, the processing apparatus 20 collects, based on an initial codebook, a plurality of pieces of electric field information of a plurality of antenna units 141/161/181 in at least one millimeter-wave antenna module 12. The step refers to collecting the electric field information of the first millimeter-wave antenna module 14, the second millimeter-wave antenna module 16, and the third millimeter-wave antenna module 18 in this embodiment. As shown in step S12, the processing apparatus 20 selects, based on the electric field information, electric field information of a millimeter-wave antenna module 12 with best performance and generates a corresponding module codebook. As shown in step S14, the processing apparatus 20 correspondingly generates a full chain codebook based on the module codebook. As shown in step S16, the processing apparatus 20 extendedly generates a sub chain codebook based on the full chain codebook. Finally, as shown in step S18, the processing apparatus 20 generates, based on the full chain codebook and the sub chain codebook, an optimized codebook by using a power saving algorithm or a cumulative distribution function 50% gain loss algorithm.

In another embodiment, refer to both FIG. 1 and FIG. 2. If only one group of millimeter-wave antenna modules 12 is disposed in the electronic apparatus 10, such as the first millimeter-wave antenna module 14 and the antenna unit 141 therein, there is no need to filter the millimeter-wave antenna module 12, so that step S12 is omitted. The processing apparatus 20 directly and correspondingly obtains the full chain codebook based on the electric field information generated by the first millimeter-wave antenna module 14. The remaining of the procedure is the same as that of the foregoing embodiment, and details are not described herein again.

In an embodiment, if power saving is a main requirement of the disclosure, the power saving algorithm is used to generate the optimized codebook based on the full chain codebook and the sub chain codebook, so that a gain loss is minimized under a specific power saving efficiency. The power saving algorithm is represented as: $L(n, W) = \min(L(n-1, W), L(n-1, W-a(n-1, w)(n)) + \ell((n-1, w)(n)))$, where $L(n, W)$ is a gain loss in a state $(n, w)$ (in comparison with that of the full chain codebook), n is a sub chain code word from 0 to n, W is a total number of antenna units to be turned off, a corresponding code word in the codebook is replaced when the nth sub chain code word is in a state $(n-1, w)$, and $a(n-1, w)(n)$ and $\ell(n-1, w)(n)$ are respectively a number of antenna units to be turned off and an additional gain loss in comparison with that of the full chain codebook.

In an embodiment, if a gain loss is a main requirement of the disclosure, the cumulative distribution function 50% gain loss algorithm is used to generate the optimized codebook based on the full chain codebook and the sub chain codebook, so that power saving efficiency is maximized under a specific gain loss. The cumulative distribution function 50% gain loss algorithm is represented as: $P(n, G) = \max(P(n-1, G), P(n-1, G-\ell(n-1, w)(n)) + a(n-1, w)(n))$, where n is a sub chain code word from 0 to n, G is a maximum acceptable gain loss (in comparison with that of the full chain codebook), $P(n, G)$ is a power saving ratio in a state $(n, G)$, a corresponding code word in the codebook is replaced when the nth sub chain code word is in a state $(n-1, w)$, $a(n-1, w)(n)$ and $\ell(n-1, w)(n)$ are respectively a number of antenna units to be turned off and an additional gain loss in comparison with that of the full chain codebook.

The optimized codebook obtained by using the power saving algorithm is substituted into an entire machine model for simulation, and the optimized codebook is compared with a third-party codebook by using different algorithms. As shown in FIG. 3*a*, FIG. 3*b*, FIG. 3*c*, and FIG. 3*d*, performance of the full chain codebook, the optimized codebook, and the third-party codebook are respectively obtained in a low-frequency vertical polarization mode, a low-frequency horizontal polarization mode, a high-frequency vertical polarization mode, and a high-frequency horizontal polarization mode. Refer to FIG. 3*a*, FIG. 3*b*, FIG. 3*c*, FIG. 3*d* and Table 1 below together. When the optimized codebook and the third-party codebook are under a closely same gain loss, it is clear that, in each mode, power saving efficiency of the optimized codebook is significantly better than that of the third-party codebook, so that the optimized codebook in the disclosure approaches to performance of the full chain codebook while taking into account power saving efficiency.

TABLE 1

| | | Mode | | | |
|---|---|---|---|---|---|
| | Performance | Low-frequency vertical polarization mode | Low-frequency horizontal polarization mode | High-frequency vertical polarization mode | High-frequency horizontal polarization mode |
| Optimized codebook | Gain loss | 30.98% | 26.49% | 33.79% | 26.85% |
| | Power saving efficiency | 37.5% | 49.58% | 37.92% | 42.08% |
| Third-party codebook | Gain loss | 31.00% | 27.57% | 34.49% | 27.31% |
| | Power saving efficiency | 32.5% | 32.5% | 32.5% | 32.5% |

The optimized codebook obtained by using the cumulative distribution function 50% gain loss algorithm is substituted into an entire machine model for simulation, and the optimized codebook is compared with a third-party codebook by using different algorithms. As shown in FIG. 4a, FIG. 4b, FIG. 4c, and FIG. 4d, performance of the full chain codebook, the optimized codebook, and the third-party codebook are respectively obtained in the low-frequency vertical polarization mode, the low-frequency horizontal polarization mode, the high-frequency vertical polarization mode, and the high-frequency horizontal polarization mode. Refer to FIG. 4a, FIG. 4b, FIG. 4c, FIG. 4d and Table 2 below together. When the optimized codebook and the third-party codebook are under a same power saving efficiency, it is clear that, in each mode, a gain loss of the optimized codebook is significantly less than that of the third-party codebook, so that the optimized codebook in the disclosure approaches to performance of the full chain codebook while taking into account a low gain loss.

TABLE 2

| Performance comparison table | | | | | |
|---|---|---|---|---|---|
| | | Mode | | | |
| | Perfor-mance | Low-frequency vertical polari zation mode | Low-frequency horizontal polari-zation mode | High-frequency vertical polari-zation mode | High-frequency horizontal polari-zation mode |
| Optimized codebook | Gain loss | 21.72% | 8.07% | 27.58% | 14.67% |
| | Power saving efficiency | 32.5% | 32.5% | 32.5% | 32.5% |
| Third-party codebook | Gain loss | 31.00% | 27.57% | 34.49% | 27.31% |
| | Power saving efficiency | 32.5% | 32.5% | 32.5% | 32.5% |

In conclusion, the disclosure provides the codebook generation method and the electronic apparatus generating the codebook, to improve performance of a millimeter-wave antenna module in an electronic apparatus (such as a mobile phone). The optimized codebook is obtained by using an innovative algorithm, to maximize performance while taking into account power saving (Power saving). A millimeter-wave transmission throughput of the electronic apparatus is increased to optimize user experience, so as to improve a deficiency that a codebook of an existing millimeter-wave antenna module is in a standard format and does not have a customized design.

The foregoing embodiments are merely described for illustrating the technical idea and characteristic of the disclosure, to enable a person skilled in the art to understand the content of the disclosure and implement the content accordingly, but are not used to limit the patent scope of the disclosure. To be specific, any equal variations or modifications made based on the spirit disclosed in the disclosure shall still fall within the application patent scope of the disclosure.

What is claimed is:

1. A codebook generation method, comprising:
collecting a plurality of pieces of electric field information of a plurality of antenna units in at least one millimeter-wave antenna module based on an initial codebook;
correspondingly generating a full chain codebook based on the electric field information;
extendedly generating a sub chain codebook based on the full chain codebook; and
generating, based on the full chain codebook and the sub chain codebook, an optimized codebook by using a power saving algorithm or a cumulative distribution function 50% gain loss algorithm.

2. The codebook generation method according to claim 1, wherein the initial codebook comprises a low-frequency vertical polarization codebook, a low-frequency horizontal polarization codebook, a high-frequency vertical polarization codebook, and a high-frequency horizontal polarization codebook.

3. The codebook generation method according to claim 1, wherein the step of collecting the electric field information of the antenna units in the at least one millimeter-wave antenna module further comprises: collecting the electric field information of the antenna units corresponding to the plurality of millimeter-wave antenna modules; selecting, based on the electric field information, electric field information of a millimeter-wave antenna module with best performance and generating a corresponding module codebook; and then, correspondingly generating the full chain codebook based on the module codebook.

4. The codebook generation method according to claim 1, wherein the full chain codebook comprises a plurality of code words, and the full chain codebook can be viewed to remove a duplicate code word and populate a new code word that is additionally generated and that corresponds to a weak coverage area.

5. The codebook generation method according to claim 1, wherein the power saving algorithm is represented as:
$L(n, W) = \min (L(n-1, W), L(n-1, W-a_{(n-1, w)}(n)) + \ell_{(n-1, w)}(n))$, wherein $L(n, W)$ is a gain loss in a state $(n, W)$, n is a sub chain code word from 0 to n, W is a total number of antenna units to be turned off, a corresponding code word in the codebook is replaced when the $n^{th}$ sub chain code word is in a state $(n-1, w)$, and $a_{(n-1, w)}(n)$ and $\ell_{(n-1, w)}(n)$ are respectively a number of antenna units to be turned off and an additional gain loss in comparison with that of the full chain codebook.

6. The codebook generation method according to claim 1, wherein the cumulative distribution function 50% gain loss algorithm is represented as:
$P(n, G) = \max(P(n-1, G), P(n-1, G-\ell_{(n-1, w)}(n)) + a_{(n-1, w)}(n))$, wherein n is a sub chain code word from 0 to n, G is a maximum acceptable gain loss, $P(n, G)$ is a power saving ratio in a state $(n, G)$, a corresponding code word in the codebook is replaced when the $n^{th}$ sub chain code word is in a state $(n-1, w)$, $a_{(n-1, w)}(n)$ and $\ell_{(n-1, w)}(n)$ are respectively a number of antenna units to be turned off and an additional gain loss in comparison with that of the full chain codebook.

7. The codebook generation method according to claim 1, wherein the initial codebook, the full chain codebook, the sub chain codebook, and the optimized codebook has a same codebook size.

8. An electronic apparatus, comprising:
at least one millimeter-wave antenna module, wherein the millimeter-wave antenna module comprises a plurality of antenna units, and the millimeter-wave antenna module enables, based on an initial codebook, all feed points of the antenna units to generate a plurality of pieces of electric field information respectively;
a processing apparatus, electrically connected to the millimeter-wave antenna module to receive the electric field information, wherein the processing apparatus correspondingly generates a full chain codebook based on the electric field information, the processing apparatus extendedly generates a sub chain codebook based on the full chain codebook, and the processing apparatus generates, based on the full chain codebook and the sub chain codebook, an optimized codebook by using a power saving algorithm or a cumulative distribution function 50% gain loss algorithm; and a storage apparatus, electrically connected to the processing apparatus to store the initial codebook, the full chain codebook, the sub chain codebook, and the optimized codebook.

9. The electronic apparatus according to claim 8, wherein the initial codebook comprises a low-frequency vertical polarization codebook, a low-frequency horizontal polarization codebook, a high-frequency vertical polarization codebook, and a high-frequency horizontal polarization codebook.

10. The electronic apparatus according to claim 8, further comprising a plurality of millimeter-wave antenna modules, enabling the processing apparatus to collect the electric field information of the antenna units corresponding to the plurality of millimeter-wave antenna modules, select, based on the electric field information, electric field information of a millimeter-wave antenna module with best performance and generate a corresponding module codebook, and then, correspondingly generate the full chain codebook based on the module codebook.

11. The electronic apparatus according to claim 8, wherein the full chain codebook comprises a plurality of code words, and the processing apparatus can view the full chain codebook to remove a duplicate code word and populate a new code word that is additionally generated and that corresponds to a weak coverage area.

12. The electronic apparatus according to claim 8, wherein the power saving algorithm is represented as: $L(n, W) = \min(L(n-1, W), L(n-1, W-a(n-1, w)(n)) + \ell(n-1, w)(n))$, wherein $L(n, W)$ is a gain loss in a state $(n, W)$, n is a sub chain code word from 0 to n, W is a total number of antenna units to be turned off, a corresponding code word in the codebook is replaced when the nth sub chain code word is in a state $(n-1, w)$, and $a(n-1, w)(n)$ and $\ell(n-1, w)(n)$ are respectively a number of antenna units to be turned off and an additional gain loss in comparison with that of the full chain codebook.

13. The electronic apparatus according to claim 8, wherein the cumulative distribution function 50% gain loss algorithm is represented as: $P(n, G) = \max(P(n-1, G), P(n-1, G-\ell(n-1, w)(n)) + a(n-1, w)(n))$, wherein n is a sub chain code word from 0 to n, G is a maximum acceptable gain loss, $P(n, G)$ is a power saving ratio in a state $(n, G)$, a corresponding code word in the codebook is replaced when the nth sub chain code word is in a state $(n-1, w)$, $a(n-1, w)(n)$ and $\ell(n-1, w)(n)$ are respectively a number of antenna units to be turned off and an additional gain loss in comparison with that of the full chain codebook.

14. The electronic apparatus according to claim 8, wherein the initial codebook, the full chain codebook, the sub chain codebook, and the optimized codebook has a same codebook size.

* * * * *